Patented July 24, 1951

2,561,516

UNITED STATES PATENT OFFICE 2,561,516

TRICHLOROMETHYLALKENES

Elbert C. Ladd and Seaphes D. Shinkle, Passaic, N. J., assignors to United States Rubber Company, New York, N. Y., a corporation of New Jersey No Drawing. Application February 20, 1948, Serial No. 9,956

4 Claims. (Cl. 260—654)

This invention relates to the production of tri-halogenomethylalkenes which are formed by a selective and partial dehydrohalogenation of 1,1,1,3-tetrahalogeno organic compounds of the type formula $X_3C$—$CHR$—$CR'R''Y$ where X is chlorine or bromine; each of R, R', and R'' is hydrogen or a radical selected from the class consisting of hydrocarbon and non-hydrocarbon groups containing hetero atoms of the class consisting of oxygen, nitrogen, chlorine, bromine and sulfur; and Y is chlorine or bromine, Y being chlorine when X is chlorine. The hydrocarbon radical can have additionally linked to it a wide variety of secondary substituents, e. g., halogen, amino; substituted amino, such as alkylamino, dialkylamino, arylamino, diarylamino, N-alkyl-N-arylamino; cyano, nitro, alkoxy, cycloalkoxy, alkenoxy, aryloxy, aralkoxy, carboxyl, carbalkoxy, carbaryloxy, carbamyl, mercapto, hydroxy, as shown below in the table.

The compounds are prepared by the selective dehydrohalogenation of 1,1,1,3-tetrahalogenopropanes and substituted derivatives thereof. The starting materials can be made available by the free-radical-catalyzed reaction of an olefinic compound $RHC$=$CR'R''$ (R, R' and R'' being as defined) with a tetrahalogenomethane $CX_3Y$ (X and Y being as defined) as illustrated by:

(1)
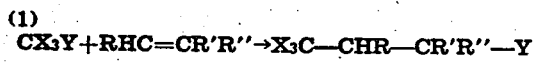

It has been found by the present invention that the starting material of this invention, viz., the 1:1 adducts as represented in Equation 1, is distinguished in its properties towards alkaline dehydrohalogenation, from those by-product compounds resulting from the combination of one mole of $CX_3Y$ with two to six moles of $$RHC=CR'R''$$

In the former case, it has been found that the reaction proceeds mainly or solely with the preferential elimination of the isolated terminal halogen atom Y, giving a high yield of olefinic compounds containing the original trihalomethyl group intact, e. g.:

(2)
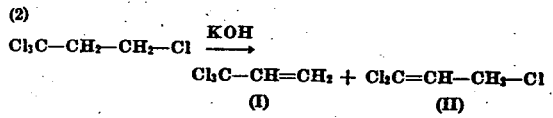

(I) predominates, and it is the sole product when 3-bromo-1,1,1-trichloropropane is used as the starting material.

In contrast, when compounds in which n is 2 to 6 are used, treatment with alkali involves a dehydrohalogenation in which halogen of the trihalomethyl group is predominantly involved. An example of this is in the case of 1,1,1,5-tetrachloropentane:

(3)
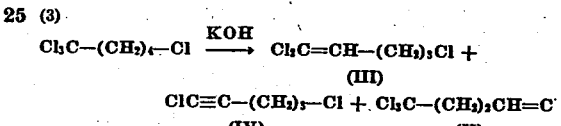

(V) is in minor amount and the explosive (IV) is in considerable proportion, which also makes the reaction difficult to control.

A representative list of products which can be prepared by this invention is given below in the table together with the reactant compounds from which these products are derived.

Table

| | Reactant | Product | |
|---|---|---|---|
| 1 | $Br_3C$—$CH_2$—$CH_2Br$ | $Br_3C$—$CH$=$CH_2$ | 3,3,3-Tribromopropene. |
| 2 | $BrCl_2C$—$CH_2$—$CH_2Br$ | $BrCl_2C$—$CH$=$CH_2$ | 3-Bromo-3,3-dichloropropene. |
| 3 | $Br_2ClC$—$CH_2$—$CH_2Br$ | $Br_2ClC$—$CH$=$CH_2$ | 3-3-Dibromo-3-chloropropene. |
| 4 | $Cl_3C$—$CH_2$—$CHCl$—$CH_3$ | $Cl_3C$—$CH$=$CH$—$CH_3$ and | 1,1,1-Trichloro-2-butene and |
| | | $Cl_3C$—$CH_2$—$CH$=$CH_2$ | 4,4,4-Trichloro-1-butene. |
| 5 | $Cl_3C$—$CH_2$—$CHCl$—$C_3H_7$ | $Cl_3C$—$CH$=$CH$—$C_3H_7$ and | 1,1,1-Trichloro-2-hexene and |
| | | $Cl_3C$—$CH_2$—$CH$=$CH$—$C_2H_5$ | 1,1,1-Trichloro-3-hexene. |
| 6 | $Cl_3C$—$CH_2$—$CHCl$—$C_6H_{13}$ | $Cl_3C$—$CH$=$CH$—$C_6H_{13}$ and | 1,1,1-Trichloro-2-nonene and |
| | | $Cl_3C$—$CH_2$—$CH$=$CH$—$C_5H_{11}$ | 1,1,1-Trichloro-3-nonene. |
| 7 | $Cl_3C$—$CH_2$—$CHCl$—$C_8H_{17}$ | $Cl_3C$—$CH$=$CH$—$C_8H_{17}$ and | 1,1,1-Trichloro-2-undecene and |
| | | $Cl_3C$—$CH_2$—$CH$=$CH$—$C_7H_{15}$ | 1,1,1-Trichloro-3-undecene. |
| 8 | $Cl_3C$—$CH_2$—$CCl(CH_3)_2$ | $Cl_3C$—$CH_2$—$C(CH_3)$=$CH_2$ | 4,4,4-Trichloro-2-methyl-1-butene. |
| 9 | $Cl_3C$—$CH(CH_3)$—$CHCl$—$CH_3$ | $Cl_3C$—$C(CH_3)$=$CHCH_3$ and | 1,1,1-Trichloro-2-methyl-2-butene and |
| | | $Cl_3C$—$CH(CH_3)$—$CH$=$CH_2$ | 4,4,4-Trichloro-3-methyl-1-butene. |

Table—Continued

| | Reactant | Product | |
|---|---|---|---|
| 10 | Cl₃C—CH₂—CBr(CH₃)—CH₂—CCl₃ | Cl₃C—CH=C(CH₃)—CH₂—CCl₃ and Cl₃C—CH₂—C(CH₃—CCl₃)=CH₂ | 1,1,1,5,5,5-Hexachloro-3-methyl-2-pentene and 1,1-Bis(beta, beta, beta-trichloroethyl) ethylene. |
| 11 | Cl₃C—CH₂—CHBr—CH₂CH₂CH=CH₂ | Cl₃C—CH=CH—(CH₂)₂—CH=CH₂ and Cl₃C—CH₂—CH=CH—CH₂—CH=CH₂ | 7,7,7-Trichloro-1,5-heptadiene and 7,7,7-Trichloro-1,4-heptadiene. |
| 12 | Cl₃C—CH₂—CHCl—C₆H₁₁ | Cl₃C—CH=CH—C₆H₁₁ | 3,3,3-Trichloro-1-cyclohexylpropene. |
| 13 | Cl₃C—CH₂—CHBr—C₆H₅ | Cl₃C—CH=CH—C₆H₅ | 3,3,3-Trichloro-1-phenylpropene. |
| 14 | p-Cl₃C—CH₂—CHBr—C₆H₄Cl | Cl₃C—CH=CH—C₆H₄Cl | Para(3,3,3-trichloro-1-propenyl) chlorobenzene. |
| 15 | p-Cl₃C—CH₂—CHBr—C₆H₄N(CH₃)₂ | Cl₃C—CH=CH—C₆H₄N(CH₃)₂ | Para-(3,3,3-trichloro-1-propenyl)-N-dimethyl aniline. |
| 16 | Cl₃C—CH₂—CHBr—C₆H₄CN | Cl₃C—CH=CH—C₆H₄CN | p-(3,3,3-Trichloro-1-propenyl) benzonitrile. |
| 17 | Cl₃C—CH₂—CHBr—C₆H₄—OCH₃ | Cl₃C—CH=CH—C₆H₄—OCH₃ | p-(3,3,3-Trichloro-1-propenyl)anisole. |
| 18 | Cl₃C—CH₂—CHBr—C₆H₃Cl₂ | Cl₃C—CH=CH—C₆H₃Cl₂ | 2,4-Dichloro-(3,3,3-trichloro-1-propenyl) benzene. |
| 19 | Cl₃C—CH₂—CHBr—C₆H₄NO₂ | Cl₃C—CH=CH—C₆H₄NO₂ | p-(3,3,3-Trichloro-1-propenyl) nitrobenzene. |
| 20 | Cl₃C—CH₂—CHBr—C₆H₄CH₃ | Cl₃C—CH=CH—C₆H₄—CH₃ | p-(3,3,3-Trichloro-1-propenyl)toluene. |
| 21 | Cl₃C—CH₂—CBr(CH₃)(C₆H₅) | Cl₃C—CH=C(CH₃)(C₆H₅) | 1,1,1-Trichloro-3-phenyl-2-butene. |
| 22 | Cl₃C—CH(C₆H₅)—CHCl—C₆H₅ | Cl₃C—C(C₆H₅)=CH—C₆H₅ | alpha-Trichloromethylstilbene. |
| 23 | Cl₃C—CH₂—CBr(C₆H₅)₂ | Cl₃C—CH=C(C₆H₅)₂ | 3,3,3-Trichloro-1,1-diphenylpropene. |
| 24 | Cl₃C—CH₂—CHCl—CH₂C₆H₅ | Cl₃C—CH=CH—CH₂—C₆H₅ and Cl₃C—CH₂—CH=CH—C₆H₅ | 4,4,4-Trichloro-2-butenylbenzene and 4,4,4-Trichloro-1-butenylbenzene. |
| 25 | Cl₃C—CH₂—CHBr—C₁₀H₇ (beta) | Cl₃C—CH=CH—C₁₀H₇ | 3,3,3-Trichloro-1(2-naphthyl)-propene. |
| 26 | Cl₃C—CH₂—CHBr—COOH | Cl₃C—CH=CH—COOH | Gamma,gamma,gamma-trichloro-crotonic acid. |
| 27 | Cl₃C—CH₂—CHCl—(CH₂)₇—COOH | Cl₃C—CH=CH—(CH₂)₇—COOH | 12,12,12-Trichloro-10-dodecenoic acid. |
| 28 | Br₂ClC—CH₂—CBr(CH₃)COOCH₃ | Br₂ClC—CH=C(CH₃)—COOCH₃ and Br₂ClC—CH=C(CH₃)—COOH and Br₂ClC—CH₂—CH(COOH)=CH₂ | Methyl gamma, gamma-dibromo-gamma-chloro-alpha-methyl crotonate and Gamma,gamma-dibromo-gamma-chloro-alpha-methyl crotonic acid and Alpha(2,2-dibromo-2-chloroethyl) acrylic acid. |
| 29 | Cl₃C—CH₂—CHBr—CONH₂ | Cl₃C—CH=CH—CO—NH₂ | Gamma, gamma, gamma-trichloro-crotonamide. |
| 30 | Cl₃C—CH₂—CHBr—CH₂OH | Cl₃C—CH=CH—CH₂OH and Cl₃C—CH₂—CH—CH₂ (with O bridge) | 4,4,4-Trichloro-2-butenyl alcohol and 1,1,1-Trichloro-3,4-butylene oxide. |
| 31 | Cl₃C—CH₂—CHBr(OC₂H₅) | Cl₃C—CH=CH—OC₂H₅ | Ethyl 3,3,3-trichloro-1-propenyl ether. |
| 32 | Cl₃C—CH₂—CBr(OC₂H₅)₂ | Cl₃C—CH=C(OC₂H₅)₂ | 3,3,3-Trichloro-1,1-diethoxypropene. |
| 33 | Cl₃C—CH₂—CHBr—OC₂H₄Cl | Cl₃C—CH=CH—OC₂H₄Cl and Cl₃C—CH=CH—O—CH=CH₂ | Beta-chloroethyl 3,3,3-trichloro-1-propenyl ether and 3,3,3-Trichloro-1-propenyl vinyl ether. |
| 34 | Cl₃C—CH₂—CHBr—OC₂H₄—OCH₃ | Cl₃C—CH=CH—OC₂H₄—OCH₃ | Beta-methoxyethyl 3,3,3-trichloro-1-propenyl ether. |
| 35 | Cl₃C—CH₂—CBr(CH₃)(OCH₃) | Cl₃C—CH=C(CH₃)(OCH₃) | 1,1,1-Trichloro-3-methoxy-2-butene. |
| 36 | Cl₃C—CH₂—CHCl—CH₂OC₂H₅ | Cl₃C—CH=CH—CH₂—OC₂H₅ and Cl₃C—CH₂—CH=CH—OC₂H₅ | 1,1,1-Trichloro-4-ethoxy-2-butene and 4,4,4-Trichloro-1-ethoxy-1-butene. |
| 37 | Cl₃C—CH(CH₂—O—C₂H₅)—CHBr—CH₂—O—C₂H₅ | Cl₃C—C(CH₂—O—C₂H₅)=CH—CH₂—O—C₂H₅ | 2-Trichloromethyl-1,4-diethoxy-2-butene. |
| 38 | Cl₃C—CH₂—CHBr—OC₆H₅ | Cl₃C—CH=CH—OC₆H₅ | Phenyl 3,3,3-trichloro-1-propenyl ether. |
| 39 | Cl₃C—CH₂—CHBr—O—C₆H₄Cl (p—) | Cl₃C—CH=CH—OC₆H₄Cl | p-Chlorophenyl 3,3,3-trichloro-1-propenyl ether. |
| 40 | Cl₃C—CH₂—CHCl—OC₆H₁₁ | Cl₃C—CH=CH—OC₆H₁₁ | Cyclohexyl 3,3,3-trichloro-1-propenyl ether. |
| 41 | Cl₃C—CH₂—CHCl—OCH₂C₆H₅ | Cl₃C—CH=CH—OCH₂C₆H₅ | Benzyl 3,3,3-trichloro-1-propenyl ether. |
| 42 | Cl₃C—CH₂—CHBr—SC₂H₅ | Cl₃C—CH=CH—SC₂H₅ | Ethyl 3,3,3-trichloro-1-propenyl sulfide. |
| 43 | Cl₃C—CH₂—CHBr—S—C₂H₄Cl | Cl₃C—CH=CH—SC₂H₄Cl and Cl₃C—CH=CH—S—CH=CH₂ | Beta-chloroethyl 3,3,3-trichloro-1-propenyl sulfide and 3,3,3-Trichloro-1-propenyl vinyl sulfide. |
| 44 | Cl₃C—CH₂—CHBr—CH₂SH | Cl₃C—CH=CH—CH₂SH and Cl₃C—CH₂—CH—CH₂ (with S bridge) | 4,4,4-Trichloro-2-butene-1-thiol and 1,1,1-Trichloro-3,4-butylene sulfide. |
| 45 | Cl₃C—CH₂—CBr(CH₃)—CH₂—S—C₂H₅ | Cl₃C—CH=C(CH₃)(CH₂—S—C₂H₅) and Cl₃C—CH₂—C(CH₂—S—C₂H₅)=CH₂ | 4,4,4-Trichloro-2-methyl-2-butenyl ethyl sulfide and 4,4,4-Trichloro-2-(ethylthiomethyl)butene. |
| 46 | Cl₃C—CH₂—CHBr—CN | Cl₃C—CH=CH—CN and Cl₃C—CH=CH—COOH | 4,4,4-Trichloro-2-butenenitrile and 4,4,4-Trichloro-crotonic acid. |
| 47 | Cl₃C—CH₂—CHBr—CH₂—CN | Cl₃C—CH=CH—CH₂—CN and Cl₃C—CH₂—CH=CH—CN | 5,5,5-Trichloro-3-pentenenitrile and 5,5,5-Trichloro-2-pentenenitrile. |
| 48 | Cl₃C—CH(CN)—CHBr—CN | Cl₃C—C(CN)=CH—CN | 2-Trichloromethyl-2-butenedinitrile. |
| 49 | Cl₃C—CH₂—CCl(CN)₂ | Cl₃C—CH=C(CN)₂ | (2,2,2-Trichloroethylidene) malonnitrile. |
| 50 | Cl₃C—CH₂—CHBr—OCO—CH₃ | Cl₃C—CH=CH—OCO—CH₃ and Cl₃C—CH₂—CHO | 3,3,3-Trichloro-1-propenyl acetate and 3,3,3-Trichloropropionaldehyde. |
| 51 | Br₃C—CH₂—CBr(CH₃)—OCO—CH₃ | Br₃C—CH=C(CH₃)(OCO—CH₃) and Br₃C—CH₂—C(OCO—CH₃)=CH₂ and Br₃C—CH₂—CO—CH₃ | 4,4,4-Tribromo-2-buten-2-yl acetate and 4,4,4-Tribromo-1-buten-2-yl acetate and 4,4,4-Tribromo-2-butanone. |
| 52 | Cl₃C—CH₂—CCl(OCO—CH₃)₂ | Cl₃C—CH=C(OCO—CH₃)₂ | 1,1-Diacetoxy-3,3,3-trichloropropene. |
| 53 | Cl₃C—CH₂—CHCl—OCO—C₆H₅ | Cl₃C—CH=CH—OCO—C₆H₅ | 3,3,3-Trichloro-1-propenyl benzoate. |
| 54 | Cl₃C—CH₂—CHBr—SCS—C₆H₅ | Cl₃C—CH=CH—SCS—C₆H₅ and Cl₃C—CH₂—CHS | 3,3,3-Trichloro-1-propenyl dithiobenzoate and 3,3,3-Trichloropropanethial. |
| 55 | Cl₃C—CH₂—CHCl—CH₂—OCO—CH₃ | Cl₃C—CH=CH—CH₂—OCO—CH₃ and Cl₃C—CH₂—CH—CH₂ (with O bridge) | 4,4,4-Trichloro-2-butenyl acetate and 1,1,1-Trichloro-3,4-epoxybutane. |

Table—Continued

| | Reactant | Product | |
|---|---|---|---|
| 56 | Cl₃C—CH₂—CHCl—CH₂—OCO—C₆H₅ | Cl₃C—CH=CH—CH₂—OCO—C₆H₅ | 4,4,4-Trichloro-2-butenyl benzoate. |
| 57 | Cl₃C—CH₂—CHCl—CH₂—OCO—C₆H₄Cl | Cl₃C—CH=CH—CH₂—OCO—C₆H₄Cl and Cl₃C—CH₂—CH=CH—OCO—C₆H₄Cl | 4,4,4-Trichloro-2-butenyl p-chlorobenzoate and 4,4,4-Trichloro-1-butenyl p-chlorobenzoate. |
| 58 | Cl₃C—CH₂—CHBr—C₅H₄N | Cl₃C—CH=CH—C₅H₄N | 2-(3,3,3-Trichloro-1-propenyl) pyridine. |
| 59 | Cl₃C—CH₂—CHBr—C₄H₃O | Cl₃C—CH=CH—C₄H₃O | 2-(3,3,3-Trichloro-1-propenyl) furan. |
| 60 | Cl₃C—CH₂—CHBr—C₄H₃S | Cl₃C—CH=CH—C₄H₃S | 2-(3,3,3-Trichloro-1-propenyl) thiophene. |
| 61 | Cl₃C—CH₂—CHBr—C₆H₉ | Cl₃C—CH=CH—C₆H₉ | 4-(3,3,3-Trichloro-1-propenyl) cyclohexene. |
| 62 | Cl₃C—CH₂—CHBr—CO—CH₃ | Cl₃C—CH=CH—CO—CH₃ | 5,5,5-Trichloro-3-penten-2-one. |
| 63 | Cl₃C—CH₂—CBr(CH₃)—CO—CH₃ | Cl₃C—CH=C(CH₃)CO—CH₃ and Cl₃C—CH₂—C(CO—CH₃)=CH₂ | 5,5,5-Trichloro-3-methyl-3-penten-2-one and 5,5,5-Trichloro-3-methylene-2-pentanone. |
| 64 | Cl₃C—CH₂—CHBr—CHO | Cl₃C—CH=CH—CHO | 4,4,4-Trichloro-2-butenal. |
| 65 | Cl₃C—CH₂—CHBr—CH₂—NH₂ | Cl₃C—CH=CH—CH₂—NH₂ | 4,4,4-Trichloro-2-butenyl amine. |
| 66 | Cl₃C—CH₂—CHBr—CH₂—N(CH₃)₂ | Cl₃C—CH=CH—CH₂—N(CH₃)₂ | N,N-dimethyl-4,4,4-trichloro-2-butenyl amine. |
| 67 | Cl₃C—CH₂—CHBr—CH₂—NH—C₆H₅ | Cl₃C—CH=CH—CH₂—NH—C₆H₅ | N-(4,4,4-Trichloro-2-butenyl) aniline. |

In the type formula $X_3C$—$CHR$—$CR'R''$—$Y$, R and R' may be hydrogen, chlorine, bromine, methyl, phenyl, carboxyl as well as hydrolyzable derivatives thereof including carbalkoxy, carbaryloxy, carbaralkoxy, carbonitrilo, carbanhydro and carbamyl, carboxyalkyl and hydrolyzable derivatives (e. g., carboxymethyl, carbonitrilomethyl), acidoxyalkyl (e. g., acetoxymethyl, benzoylmethyl, diethyl, phosphato, methyl sulfato and triethyl silicato), hydroxyalkyl (e. g., methylol) and haloalkyl (e. g., chloromethyl), ethylene, trimethylene and tetramethylene, and R'' may be R as well as alkyl (e. g., methyl, ethyl, propyl, isopropyl, butyl, amyl, cyclopentyl, hexyl, cyclohexyl, heptyl, octyl, nonyl and decyl), alkenyl excluding 1-alkenyl (e. g., 3-butenyl and 4-cyclohexenyl), aryl (e. g., phenyl, tolyl, xylyl, naphthyl, xenyl, p-chlorophenyl, o,p-dichlorophenyl, p-trichloromethylphenyl, p-fluorophenyl, p-trifluoromethylphenyl, p-methoxyphenyl and p-carboxyphenyl), aralkyl (e. g., benzyl), acidyl (e. g., acetyl, butyryl, benzoyl, ethyl sulfonyl, diethyl phosphonyl and triethylsilicyl), acidylalkyl (e. g., acetylmethyl), alkoxy (e. g., methoxy, ethoxy, 2-hydroxyethoxy, and butoxy), aryloxy (e. g., phenoxy and p-chlorophenoxy), aralkoxy (e. g., benzyloxy and 2-phenylethoxy) as well as the corresponding alkoxyalkyl, aryloxyalkyl and aralkoxyalkyl (e. g., methoxymethyl, butoxymethyl, ethoxyethyl, methoxypropyl, methoxynonyl, phenoxymethyl, naphthoxymethyl and benzyloxymethyl) including the corresponding thioether groups, acidoxy (e. g., acetoxy, butyroxy, capryloxy and benzoyloxy), pyridyl, thienyl and furyl, at least one of R, R' and R'' being preferably hydrogen and R being hydrogen when R' and R'' are hydrogen.

The above radicals containing one or more hetero atoms may be attached directly to the carbon chain bearing the terminal halogens X and Y, or the radicals may be separated therefrom by intervening alkylene, cycloalkylene, arylene hydrocarbon or ether groups, in which case R, R', and R'' may also be hydroxyl, mercapto, alkylamino, dialkylamino, arylamino, diarylamino, and N-alkyl-N-arylamino.

In their order of preference, the above reactants may be classified as follows:

Class A.—$X_3C$—$CH_2CR'R''Y$, where R' is hydrogen or alkyl, preferably methyl, and R'' is hydrogen, chlorine, alkyl, alkenylalkyl, cycloalkyl, aryl, carboxyl, and carboxyalkyl as well as hydrolyzable derivatives thereof including carbonitrilo, carbalkoxy and carbalkoxyalkyl, alkoxy, alkoxyalkyl, alkenoxy, alkenoxyalkyl, aralkoxy, as well as the corresponding thioether groups, acyl, acylalkyl, acyloxy, acyloxyalkyl; X and Y being as above defined.

Class B.—$X_3C$—$CH_2$—$CHR''Y$, X and Y being as above defined; R'' being as defined in class A.

Class C.—$X_3C$—$CH_2$—$CR'_2Y$, where R' is alkyl, aryl, carboxyl, carboxyalkyl including hydrolyzable derivatives thereof, alkoxyalkyl, acyloxy and acyloxyalkyl; X and Y being as above defined.

Class D.—$X_3C$—$CHR'$—$CHR'$—$Y$, where R' is as defined above in class B; X and Y being as above defined.

The new compounds of our invention are useful as intermediates in the synthesis of other compounds and in the preparation of addition polymers.

A preferred class of the new trihalogenomethyl olefinic compounds subscribe to the type formula $X_3C$—$C(R)=CR'R''$ in which the hydrogen removed has been that from the carbon atom alpha to the $CX_3$ group.

The dehydrohalogenation reactions of our invention are carried out by treatment of compounds of the type formula $X_3C$—$CHR$—$CR'R''Y$ with at least a molar equivalent, and preferably from 1 to 2 molar equivalents, of an alkali, preferably a strong inorganic alkali, e. g., alkali and alkaline earth metal hydroxides such as sodium hydroxide, potassium hydroxide and calcium hydroxide. The reactions are exothermic and require no more than mild heating, and may be carried out at from 0–100° C., and preferably below 60° C., to effect completion of the reactions. The requirement of using not more than 2 molar equivalents for each molar equivalent of the first mentioned compound is critical in this invention for the reason that above this proportion there is a tendency to form products in which the terminal $Cl_3C$— group has lost one or more chlorine atoms. The reaction time will depend to some extent on the specific organic reactant employed, as well as on its concentration in the reaction mixture, and times in the range of 0.5 to 5 hours usually suffice.

Inert diluents such as hydrocarbons, alcohols, and ethers may be employed to dissipate the heat of the reaction and/or to homogenize the reactant mixture.

At the end of the reaction the precipitated inorganic salts are removed by filtration, the filtrate is evaporated to remove inert diluents, if any, and the residue is purified by conventional techniques such as fractional distillation, crystallization, etc.

The following examples disclose our invention in more detail.

Example 1

A solution of 342 g. (6.1 moles) of 85% potassium hydroxide in 3 liters of 95% aqueous ethanol is added dropwise to 1090 g. (6.0 moles) of vigorously agitated 1,1,1,3-tetrachloropropane. The reaction is exothermic and the temperature is maintained in the vicinity of 25° C. by controlling the rate of addition of the alkali and, if necessary, by occasional cooling of the reaction vessel. When all of the alkali has been added, the reaction mixture is diluted with two volumes of water and the non-aqueous layer is separated and dried. Fractional distillation of the latter yields 304.5 g. of the new compound 3,3,3-trichloropropene, B. 44–45.5° C./103 mm., 100.5° C./762 mm.; $n_D^{20}$ 1.4678;

$d_4^{20}$ 1.3322

$MR_D$ 30.38 (theory 30.19).

*Analysis.*—Found, 73.13% Cl (theory 73.15%). From the above distillation are also obtained 110.6 g. of the isomeric 1,1,3-trichloropropene, B. 74–5° C./103 mm.; $n_D^{20}$ 1.4960;

$d_4^{20}$ 1.3982

$MR_D$ 30.38 (theory 30.19).

*Analysis.*—Found, 73.02% Cl (theory 73.15%).

The structure of the 3,3,3-trichloropropene has been confirmed by oxidation to chloroform with aqueous potassium permanganate, the degradation presumably occurring through the intermediate formation of trichloroacetic acid which is unstable under such oxidizing conditions, losing $CO_2$:

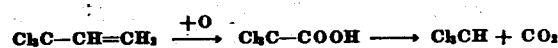

Our new 3,3,3-trichloropropene adds bromine readily to form the new compound 1,1,1,-trichloro-2,3-dibromopropane, B. 85° C./4.5 mm.; $n_D^{20}$ 1.5633:

*Analysis.*—Found, 58.02% total halogen as chlorine (theory, 58.08%).

Moreover, our 3,3,3-trichloropropene undergoes a violent exothermic reaction in the presence of even a trace of ferric chloride at room temperature, with copious evolution of hydrogen chloride and concurrent resinification and discoloration of the residue. This behavior is in marked contrast to that of other isomers such as 1,1,3-trichloropropene, which undergoes little or no apparent reaction with even an appreciable quantity of ferric chloride at room temperature.

Example 2

Sixty-seven and nine-tenths grams (0.3 mole) of 3-bromo-1,1,1-trichloropropane are dehydrobrominated by treatment with a solution of 22.0 g. (0.33 mole) of 85% potassium hydroxide in 100 ml. of 95% ethanol in the same manner as Example 1, to yield 36 g. of the same 3,3,3-trichloropropene, B. 45–7° C./103 mm.; $n_D^{20}$ 1.4677.

Example 3

To an agitated solution of 98 g. (0.5 mole) of 1,1,1,3-tetrachlorobutane in 50 ml. of 95% ethanol are slowly added 36.3 g. (0.55 mole) of finely divided solid 85% potassium hydroxide. The reaction temperature is maintained at below 50° C., and after all the alkali has been added, the reaction mixture is cooled and diluted with 200 ml. of water. The non-aqueous layer is separated, dried and fractionally distilled to yield 57.6 g. of the new compound 1,1,1-trichloro-2-butene, B. 79.8–80.3° C./103 mm.; $n_D^{20}$ 1.4819;

$d_4^{20}$ 1.2859

$MR_D$ 35.41 (theory, 34.81).

*Analysis.*—Found, 67.14% Cl; (theory, 66.71%). This compound undergoes a violent exothermic reaction at room temperature in the presence of a catalytic amount of ferric chloride, with evolution of hydrogen chloride and resinification of the residue.

Example 4

In an analogous fashion to that of Example 3 above, 1,1,1,3-tetrachloro-3-methylbutane is dehydrochlorinated by an equimolar quantity of potassium hydroxide to yield the new compound 4,4,4-trichloro-2-methyl-1-butene, B. 89–91° C./103 mm.; $n_D^{20}$ 1.4747;

$d_4^{20}$ 1.2398

$MR_D$ 39.36 (theory, 39.42).

*Analysis.*—Found, 61.34% Cl (theory, 61.35%).

Example 5

A solution of 330 g. (5.0 moles) of 85% potassium hydroxide in 1250 ml. of 95% ethanol is added dropwise and with continuous stirring to 1153 g. (4.5 moles) of 2-bromo-4,4,4-trichloro-1-butanol in the course of 2.5 hours. The reaction temperature is maintained at 14–22° C. by cooling. After addition of the alkali is complete, the reaction mixture is filtered to remove potassium bromide and the filtrate is fractionally distilled to yield 318.4 g. of the new compound 1,1,1-trichloro-3,4-epoxybutane, B. 79–81° C./25 mm.; $n_D^{20}$ 1.4813;

$d_4^{20}$ 1.4260

$MR_D$ 35.04 (theory, 35.01).

*Analysis.*—Found, 60.49% Cl (theory, 60.63%). The above distillation likewise yields 28.7 g. of the new compound 4,4,4-trichloro-2-butenol, B. 64–5° C./1.0 mm.; $n_D^{20}$ 1.5043.

*Analysis.*—Found, 59.92% Cl (theory, 60.63%).

Example 6

In a manner analogous to Example 5 above, 2-bromo-4,4,4-trichlorobutyl acetate is dehydrobrominated by treatment with an equimolar amount of alcoholic alkali to yield a mixture of 4,4,4-trichloro-2-buten-1-ol and 4,4,4-trichloro-1,2-epoxybutane, the latter predominating.

Example 7

In the manner of Example 5 above, 156 parts of 2-bromo-4,4,4-trichloro-2-methylbutyl acetate are treated with a solution of 34 g. of 85% potassium hydroxide in 125 ml. of ethanol for 9 hours. Fractional distillation of the reaction products yields 49.2 parts of 1,1,1-trichloro-3,4-epoxy-3-methylbutane, B. 50–52° C./5 mm.; per cent chlorine, 56.10 (theory, 56.14), as well as 15 parts of 4,4,4-trichloro-2-methyl-2-butenal acetate, B. 98–106° C./2.7 mm.; per cent chlorine 45.05 (theory, 46.1).

Having thus described our invention, what we claim and desire to protect by Letters Patent is:

1. A trichloromethyl olefine containing a terminal trichloromethyl group and having an ethylenically-bonded carbon atom in the beta position to said trichloromethyl group, which trichloromethyl olefin is selected from the group consisting of a trichloropropene boiling at 44–47° C. at 103 mm. Hg pressure, and having a refractive index of $n_D^{20}$ 1.4677–1.4678; a trichloro- 2 - methyl - 1 - butene boiling at 89–91° C. at 103 mm. Hg pressure, and having a refractive index of approximately $n_D^{20}$ 1.4747; and a trichloro - 2 - butene boiling at 79.8–80.3° C. at 103 mm. Hg pressure and having a refractive index of approximately $n_D^{20}$ 1.4819.

2. A trichloropropene boiling at 44–47° C. at 103 mm. Hg pressure, and having a refractive index of $n_D^{20}$ 1.4677–1.4678.

3. A trichloro-2-methyl-1-butene boiling at 89–91° C. at 103 mm. Hg pressure, and having a refractive index of $n_D^{20}$ 1.4747.

4. A method of preparing the compound given in claim 4 which comprises subjecting 1,1,1,3-tetrachloropropane to alkaline dehydrochlorination using from 1 to 2 molar equivalents of alkali for each molar equivalent of said compound, for a time and at a temperature sufficient to form a predominant quantity of the desired compound.

ELBERT C. LADD.
SEAPHES D. SHINKLE.

REFERENCES CITED

The following references are of record in the file of this patent:

UNITED STATES PATENTS

| Number | Name | Date |
|---|---|---|
| 2,410,541 | Joyce | Nov. 5, 1946 |
| 2,440,800 | Hanford et al. | May 4, 1948 |
| 2,468,208 | Kharasch | Apr. 26, 1949 |

OTHER REFERENCES

"Chemical Abstracts," vol. 34, column 7847 (1940). Abstract of article by Nagabina.

Kharasch: "Science," vol. 102, page 128 (1945).

Certificate of Correction

Patent No. 2,561,516                                                  July 24, 1951

ELBERT C. LADD ET AL.

It is hereby certified that error appears in the printed specification of the above numbered patent requiring correction as follows:

Column 9, line 14, for the claim reference numeral "4" read *2*;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*